(12) United States Patent
Payton

(10) Patent No.: US 8,529,245 B1
(45) Date of Patent: Sep. 10, 2013

(54) UNDERCUT MOLD INSERT

(76) Inventor: George Roy Payton, Chino Hills, CA (US)

(*) Notice: Subject to any disclaimer, the term of this patent is extended or adjusted under 35 U.S.C. 154(b) by 93 days.

(21) Appl. No.: 13/287,045

(22) Filed: Nov. 1, 2011

Related U.S. Application Data

(60) Provisional application No. 61/409,615, filed on Nov. 3, 2010.

(51) Int. Cl.
*B29C 45/44* (2006.01)

(52) U.S. Cl.
USPC ............... 425/577; 425/438; 425/DIG. 58

(58) Field of Classification Search
USPC ................... 425/577, DIG. 58, 438
See application file for complete search history.

(56) References Cited

U.S. PATENT DOCUMENTS

| | | | |
|---|---|---|---|
| 3,406,232 A | 10/1968 | Barker | |
| 4,027,723 A | 6/1977 | Maurino et al. | |
| 4,161,060 A | 7/1979 | Lenne et al. | |
| 4,383,673 A | 5/1983 | Laprade et al. | |
| 4,921,341 A | 5/1990 | Ace | |
| 5,693,036 A | 12/1997 | Kilgour | |
| 6,071,111 A * | 6/2000 | Doke et al. | 425/DIG. 58 |
| 6,099,785 A * | 8/2000 | Schweigert et al. | 425/577 |
| 2010/0085533 A1 | 4/2010 | Calilung et al. | |

* cited by examiner

*Primary Examiner* — Tim Heitbrink
(74) *Attorney, Agent, or Firm* — Mind Law Firm, P.C.; Justin G. Sanders; Jeromye V. Sartain

(57) ABSTRACT

An undercut mold insert apparatus is disclosed for forming an undercut on an inner surface of a molded part. The apparatus provides, in an exemplary embodiment, a disk substantially shaped to approximate the dimensions of the object that is to be subsequently positioned within the undercut, the disk itself comprising an inner portion and a substantially circumferentially integral perimeter portion. The perimeter portion is configured for forming the undercut. The inner portion is configured for at least partially radially collapsing when appropriate force is applied thereto. As such, during the molding process, in which the apparatus is appropriately positioned within and subsequently forms the undercut of the molded part, upon cooling of the molded part, the inner portion is able to at least partially radially collapse, allowing substantially the entire perimeter portion to be disengaged from within the undercut before the apparatus is removed therefrom.

13 Claims, 6 Drawing Sheets

UNDERCUT MOLD INSERT

RELATED APPLICATIONS

This application claims priority and is entitled to the filing date of U.S. Provisional application Ser. No. 61/409,615, filed Nov. 3, 2010 and entitled "Flexible Mold Insert." The contents of the aforementioned application are incorporated by reference herein.

INCORPORATION BY REFERENCE

Applicant hereby incorporates herein by reference any and all U.S. patents and U.S. patent applications cited or referred to in this application.

BACKGROUND

1. Field of the Invention

Aspects of this invention relate generally to mold inserts, and more particularly to an undercut mold insert capable of selectively and sufficiently flexing or otherwise mechanically shifting for use in forming groove-like undercuts on an inner surface of a molded part.

2. Description of Related Art

By way of background, a major concern in the molding industry is how to successfully and consistently form a groove in at least a portion of an inner surface of a molded part. One type of molded part that requires such a groove are frames for holding lenses, such as in eyewear; the groove being configured for holding a lens therewithin. Presently, manufacturers typically use a rigid steel or other metal "potato chip" insert. With the insert located within an injection mold, the mold is closed about the insert, and the plastic material is injected into the mold. The insert extends into the cavity of the mold to form the lens retention groove. Upon cooling, the insert is pulled or pushed out. Because the insert is relatively rigid compared to the frame material, and because the frame material tends to be at its most fragile state right after cooling, the lip of the retention groove, along with the rest of the frame, has a tendency to become deformed while being pulled or to snap back and create surface marring and stress fractures that are unacceptable under industry standards. This not only produces a high "scrap rate" (often up to twenty-five percent or more due to unacceptable permanent deformation of the frame), but it also limits frame design options to essentially only those that can accommodate the removal of such a rigid insert during the molding process. Further, rigid inserts tend to damage the mold itself and drive up tooling and repair costs, causing some manufacturers to resort to manually removing the molded part from the mold. Finally, manufacturers using rigid inserts are limited to relatively shallow retention grooves, because deeper grooves would not permit withdrawal of rigid inserts without damage and, thus, even higher scrap rates.

In an attempt to solve these problems, some manufacturers use relatively flexible mold inserts, as opposed to the traditional rigid inserts. Because these improved inserts are able to flex as they are pulled from the molded groove, the likelihood of the groove being deformed or the frame damaged is reduced. However, even these flexible inserts must still have a certain degree of rigidity so as to maintain their structural integrity during the molding process and ensure that the groove is properly formed about the inner surface of the molded part. Thus, while these flexible inserts may reduce the scrap rate, they can still cause the same deformation and surface marring as the more rigid inserts, especially when the groove being formed is relatively deep.

A still further improved insert, as described in U.S. Pat. No. 3,406,232 to Barker, comprises a resilient ring-like structure that is used in the molding of undercuts in substantially the same way as the above described rigid and flexible "potato chip" inserts. This improved insert provides a pair of tool-receiving holes positioned proximal diametrically opposed edges thereof. Thus, upon cooling of the molded frame, a special tool is inserted into each of the tool-receiving holes, enabling the tool to pinch and radially deform the insert such that the diametrically opposed edges proximal the holes become at least partially disengaged from the undercut, which allows the insert to then be more easily removed from the frame. While such an insert design allows for relatively easier removal from the frame, as compared to the "potato chip" prior art, the fact that at least a portion of the insert edge remains in contact with the undercut after the insert has been radially deformed means that there will still potentially be a certain amount of resistance in removing the insert. Thus, depending on the materials of construction used in each of the insert and molded frame, as well as the size and shape of the frame and associated undercut being formed, there is still a chance that removal of such an insert will cause similar deformation and surface marring as the "potato chip" inserts.

Therefore, there is still a need for a mold insert capable of selectively and sufficiently flexing or otherwise mechanically shifting such that substantially the entire perimeter edge of the insert may be disengaged from within the frame undercut before the insert is removed, thus enabling the insert to produce relatively deep retention grooves to effectively hold lenses even in complex frame designs, while substantially reducing both scrap rates and tooling costs. Aspects of the present invention fulfill these needs and provide further related advantages as described in the following summary.

SUMMARY

Aspects of the present invention teach certain benefits in construction and use which give rise to the exemplary advantages described below.

The present invention solves the problems described above by providing an undercut mold insert apparatus for forming an undercut on an inner surface of a molded part, the undercut sized and configured for subsequently accepting and retaining an object therewithin, as discussed in detail below. The apparatus provides, in an exemplary embodiment, a disk substantially shaped to approximate the dimensions of the object, the disk itself comprising an inner portion and a substantially circumferentially integral perimeter portion. The perimeter portion is configured for extending a distance into the inner surface of the molded part during the molding process, thereby forming the undercut therewithin. The inner portion is configured for at least partially radially collapsing when appropriate force is applied thereto. As such, during the molding process, in which the apparatus is appropriately positioned within and subsequently forms the undercut of the molded part, upon cooling of the molded part, the inner portion is able to at least partially radially collapse, allowing substantially the entire perimeter portion to be disengaged from within the undercut before the apparatus is removed therefrom.

A primary objective inherent in the above described apparatus and method of use is to provide advantages not taught by the prior art.

Another objective is to provide such an apparatus that is capable of producing relatively deep undercuts in a molded part, while substantially reducing both scrap rates and tooling costs.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the present invention. In such drawings.

DETAILED DESCRIPTION

The above described drawing figures illustrate aspects of the invention in at least one of its exemplary embodiments, which are further defined in detail in the following description.

Figure 1:
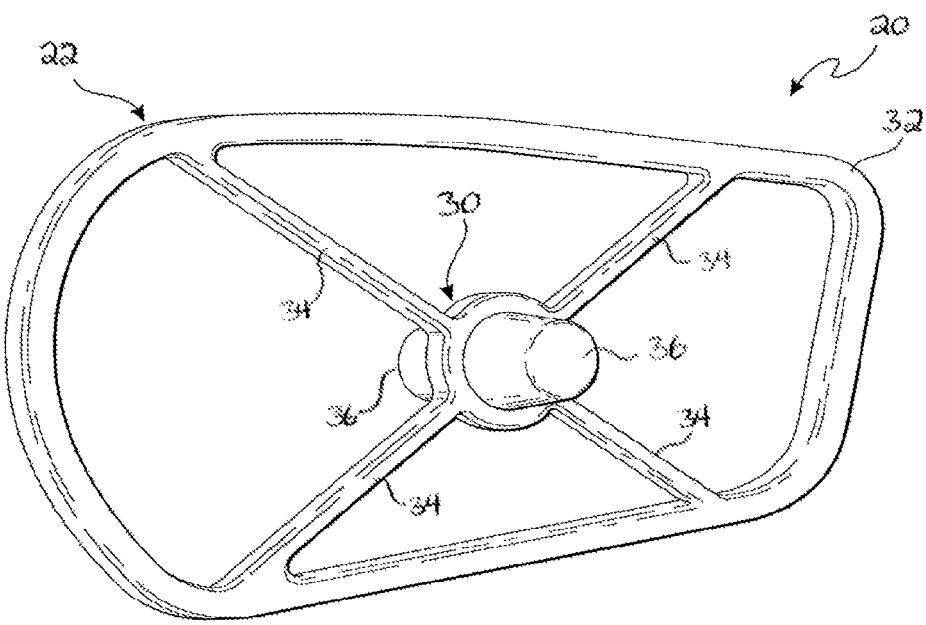
FIG. 1 is a perspective view of an exemplary embodiment of the undercut mold insert apparatus.

Turning now to FIG. 1, there is shown a perspective view of an exemplary embodiment of an undercut mold insert apparatus 20. The apparatus 20 comprises, in the exemplary embodiment, a disk 22 substantially shaped to approximate the dimensions of an object that is to ultimately be inserted into an undercut of a molded part in the place of the disk 22. For illustrative purposes, the present invention will be described in the context of eyewear manufacturing. However, it should be noted that the present invention should not be read as being so limited. In fact, the present invention can be used in the manufacture of virtually any molded part that requires a groove or undercut to be formed on at least a portion of an inner surface of that molded part, to accommodate the later insertion of a separately manufactured part within that groove or for other such purpose.

Figure 2:
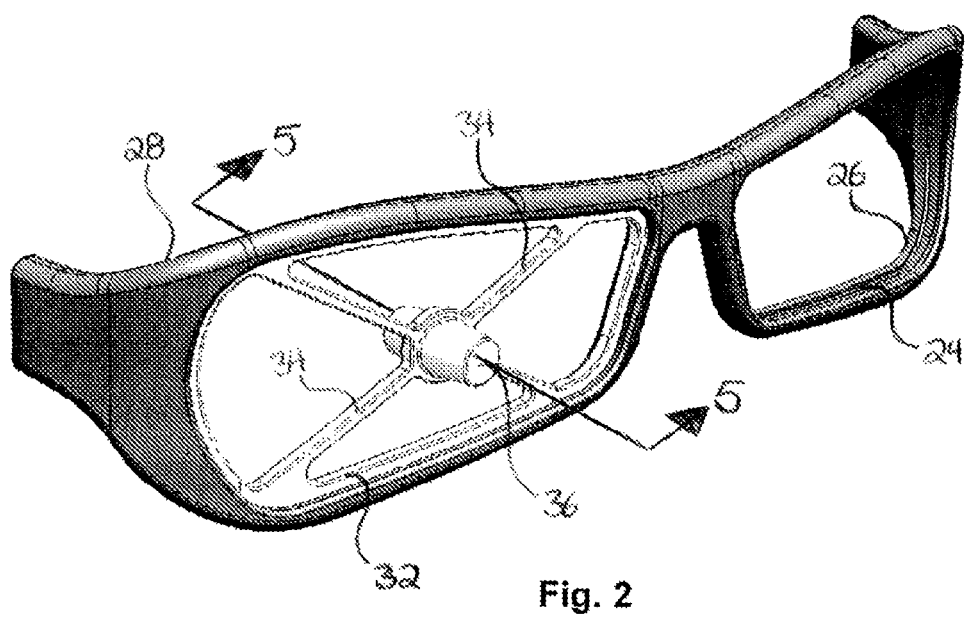
FIG. 2 is a perspective view of an exemplary embodiment of the apparatus as positioned within an exemplary molded eyewear frame.

In the context of eyewear manufacturing, as best shown in FIG. 2, the apparatus 20 is used in forming a retention groove 24 on an inner surface 26 of a molded eyewear frame 28, the retention groove 24 being sized and configured for subsequently accepting and retaining an eyewear lens (not shown). Thus, in the eyewear context, the disk 22 is substantially shaped to approximate the dimensions of the lens.

Preferably, the disk 22 is made from a relatively flexible material such as polyester, nylon, or the like, which not only enables the disk 22 to be sufficiently flexible, but also to withstand the heat and pressure associated with the molding process. Additionally, the material is such that the disk 22 does not bond with the frame 28 during the molding process. In alternate embodiments, the disk 22 may be made of any material, or combination of materials, now known or later developed, that enables the apparatus 20 to carry out substantially the same functionality as herein described.

Figure 3:
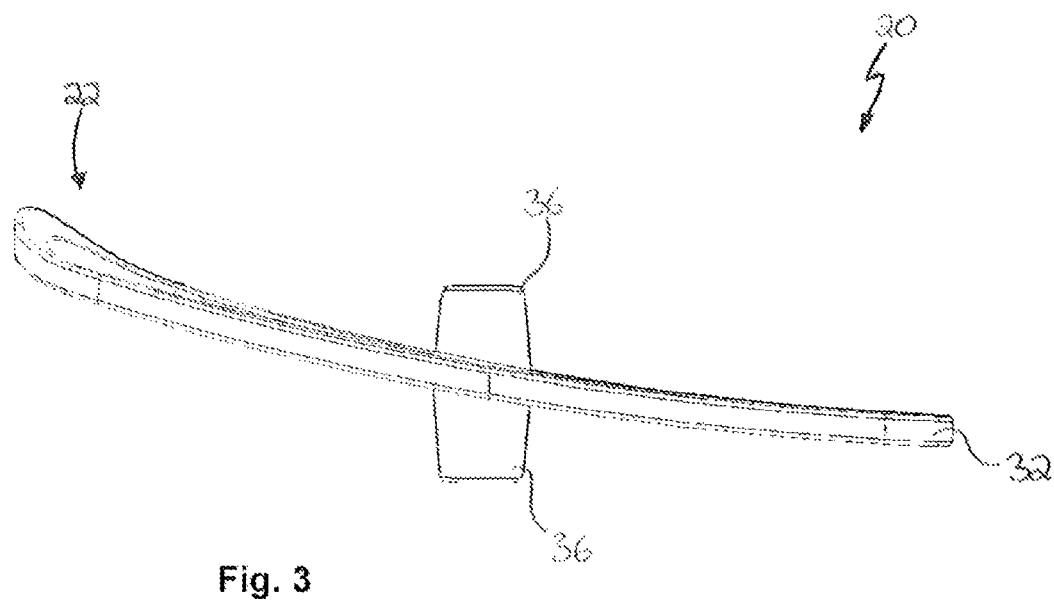
FIG. 3 is a top view of an exemplary embodiment of the apparatus.
Figure 4:
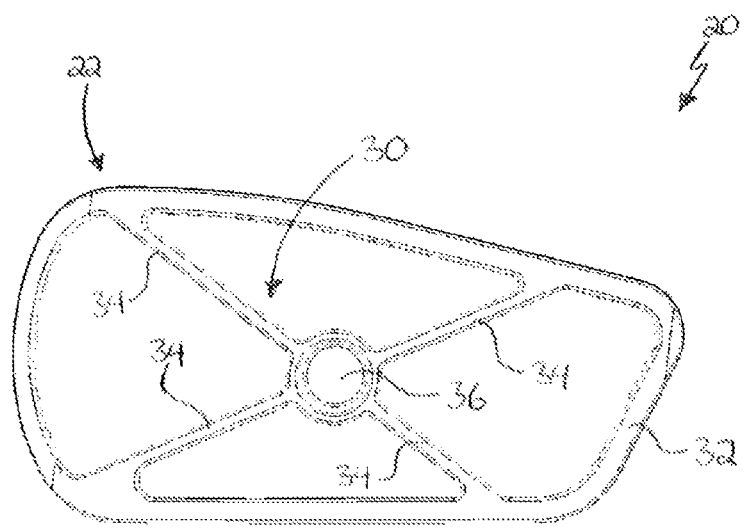
FIG. 4 is a front view thereof.

As best shown in FIGS. 1, 3 and 4, the disk 22, in the exemplary embodiment, is relatively flat and comprises an inner portion 30 and a substantially circumferentially integral perimeter portion 32. Preferably, the inner portion 30 is relatively thin so as to enable it to sufficiently flex or otherwise mechanically shift such that substantially the entire perimeter portion 32 may be disengaged from within the retention groove 24 before the disk 22 is removed during the molding process. By way of example, in the exemplary embodiment, the inner portion 30 is approximately sixty thousandths of an inch (0.060") thick; though, the exact thickness will vary depending on the dimensions of the object for which the retention groove 24 is being formed. In the exemplary embodiment, the inner portion 30 comprises a plurality of spoke members 34, which provide the necessary structural integrity yet also assist in allowing the inner portion 30 to more easily flex and/or radially collapse during removal, as further discussed below. In alternate embodiments, the inner portion 30 may take on other configurations, now known or later developed, that enable it to carry out substantially the same functionality herein described. The perimeter portion 32, configured for forming the retention groove 24, may be relatively thicker than the inner portion 30, depending on the desired depth and width of the retention groove 24 to be formed. Additionally, the inner portion 30 preferably provides a substantially centrally positioned locating means 36 which may not only assist in positioning the disk 22 within the mold, but also removing the disk 22, depending on the method used for removal, as discussed further below.

Figure 5A:
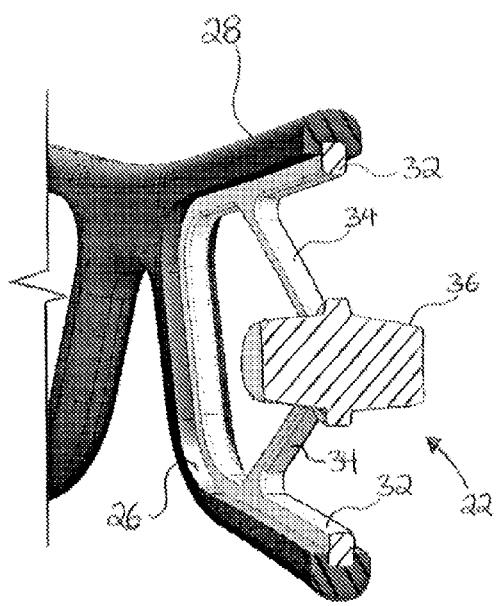
FIGS. 5A and 5B are partial cross-sectional views taken along line 5-5 of FIG. 1.

During the actual molding process, the disk 22 itself is molded first. Once cooled, the disk 22 is positioned appropriately within the cavity of the injection mold for the frame 28 and the mold is closed about the disk 22. It will be appreciated by those skilled in the art that while the disk 22 has sufficient flexibility for removal from the molded part as herein described, in large measure dictated by the relatively thin, spaced-apart spoke members 34 in the exemplary embodiment, the necessary relative stiffness and positional integrity of the disk 22, and particularly the perimeter portion 32, during the molding process is achieved by simply having the two-half mold core clamp on the disk 22, including filling the spaces between the spoke members 34, such that the disk 22 and its perimeter portion 32, though in and of themselves being relatively thin and flexible as supported by the mold core when the frame 28 or other part is molded, are able to nevertheless provide the forming surface particularly for the retention groove 24. Thus positioned within the mold, the frame material is then injected into the cavity of the mold over the disk 22, the disk 22 being positioned such that the perimeter portion 32 extends a distance into the inner surface 26 of the frame 28 being molded, thereby forming the retention groove 24, as shown best in the cross-sectional view of FIG. 5A. It should be noted that, up to this point, the process is very similar to that of the known prior art, which is why these steps are not shown in the drawings. However, in the exemplary embodiment, where the inner portion 30 comprises a plurality of spoke members 34, the apparatus 20 does provide at least one added benefit to this portion of the molding process. More specifically, by virtue of the spoke members 34 being relatively spaced apart from one another, injection of the frame material is capable of extending between the spoke members 34 and taking place on the inside of the frame 28, proximal the inner surface 26. Such a positioning of the mold injection site substantially hides the resulting gate blemish and reduces the need for buffing the blemish away after the molding process is completed. The apparatus 20 provides even further benefits during the remainder of the molding process.

Figure 5B:
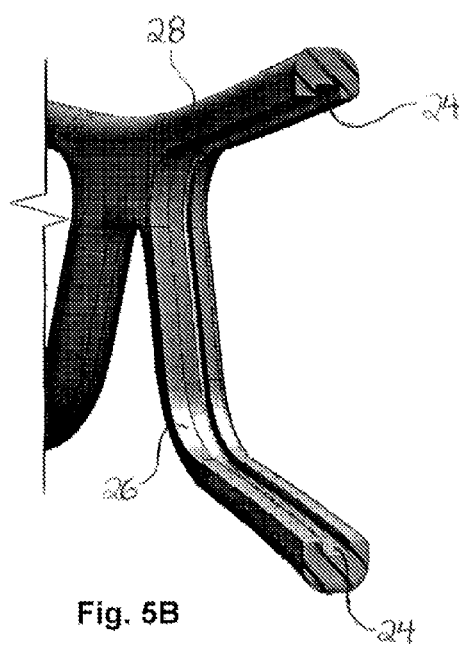
Figure 6:
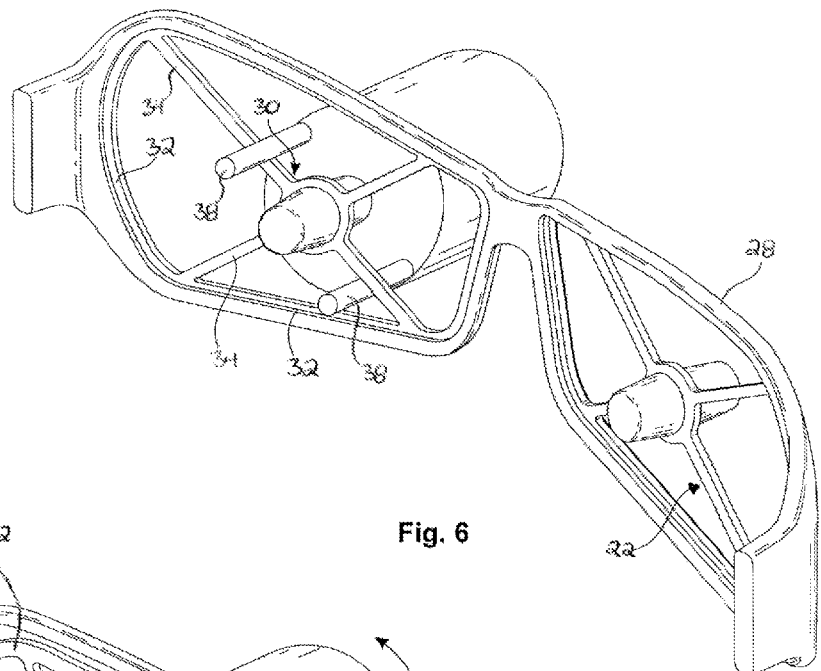
FIGS. 6 and 7 are perspective views of an exemplary embodiment of the apparatus positioned within the exemplary molded eyewear frame, illustrating an exemplary method of removing the apparatus therefrom.
Figure 7:
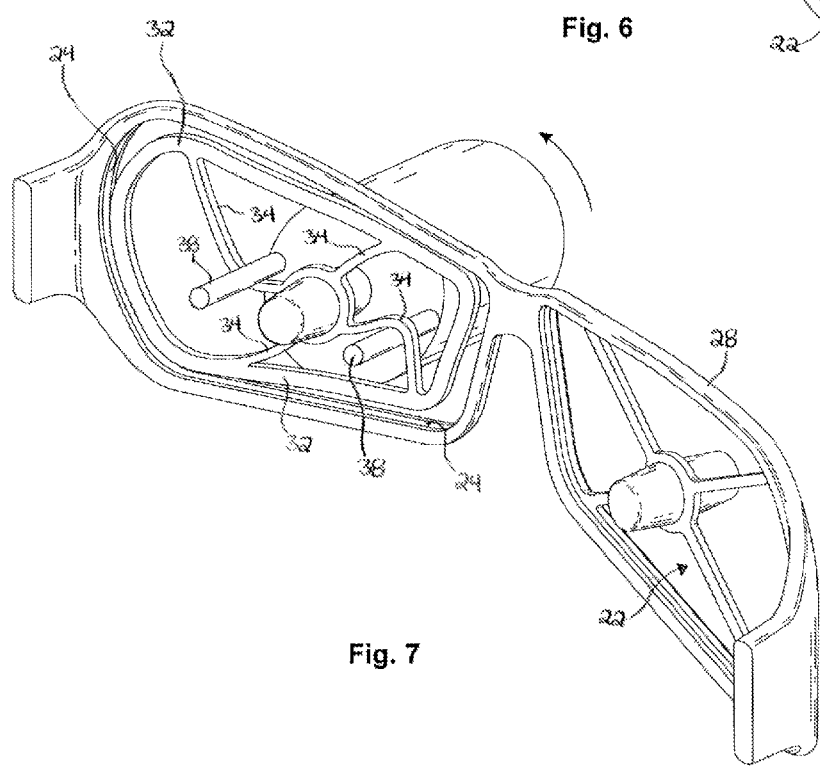

Upon cooling of the frame 28, the disk 22 is then flexed and/or radially collapsed, such that substantially the entire perimeter portion 32 is disengaged from within the now-formed retention groove 24. In the exemplary embodiment, as shown in FIGS. 6 and 7, this is preferably accomplished by inserting at least two pins 38 (or similar elongate objects) between the spoke members 34 and rotating the pins 38 in a clockwise or counter-clockwise fashion, causing the flexible inner portion 30 to twist and radially collapse inwardly onto the pins 38 along with the perimeter portion 32. With the perimeter portion 32 substantially disengaged from within the retention groove 24, the disk 22 is then pulled out and either discarded or re-used. As shown in the cross-sectional view of FIG. 5B, the frame 28 is then left with a substantially well-defined and un-damaged retention groove 24 that is ready to receive the lens therewithin. It should be noted that, depending on the particular application, the disk 22 may be left in the retention groove 24 for a period time after the molded part has cooled, while the molded part undergoes various post-processing procedures, such as polishing, painting or finishing, in order to better protect and maintain the integrity of the retention groove 24 during those procedures.

Figure 8:
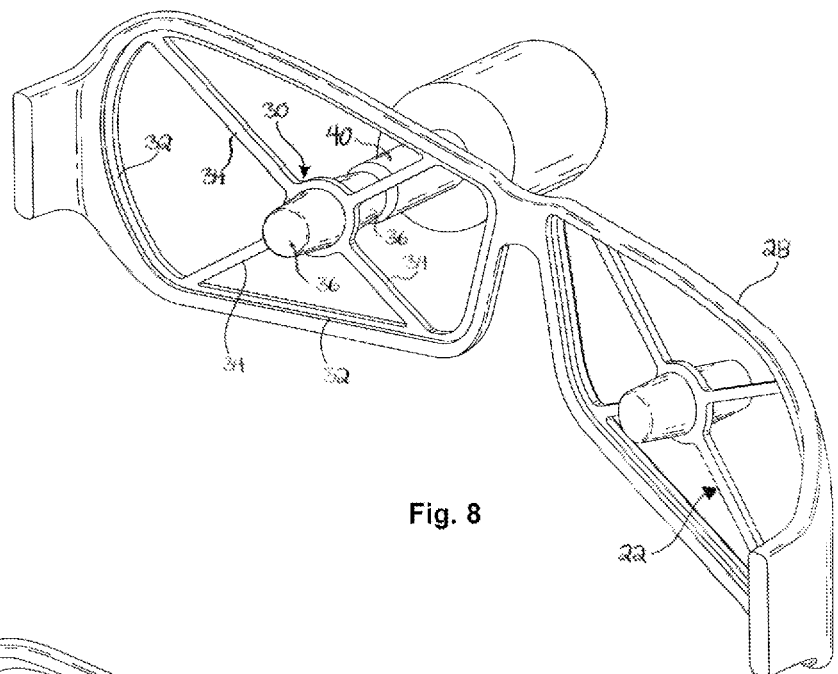
FIGS. 8 and 9 are further perspective views thereof, illustrating an alternate exemplary method of removing the apparatus from the exemplary molded eyewear frame.
Figure 9:
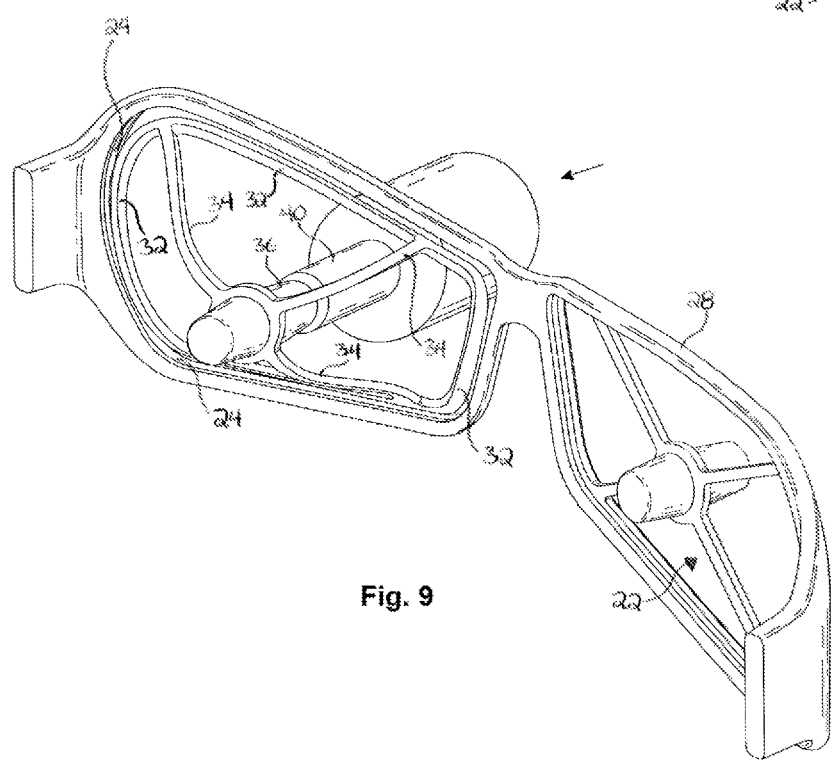

It should be noted that the present invention is configured for also being pushed or pulled out in a more conventional fashion, similar to the known prior art. Given the spoked structure of the exemplary embodiment of the disk 22, and thus the relatively minimal surface area thereof, the inner portion 30 is capable of flexing with relative ease when a substantially perpendicular force is applied to the locating means 36 by a rod 40 or the like, as shown in FIGS. 8 and 9. When such flexing occurs, the perimeter portion 32 tends to partially radially collapse inwardly, thereby at least partially disengaging from the retention groove 24. Thus, as the disk 22 is pushed out from within the frame 28, the likelihood of damaging the frame 28 or retention groove 24 is substantially reduced.

It should also be noted that, while FIGS. 6-9 show only one of the disks 22 being removed from the frame 28 for illustrative purposes, in practice, each of the disks 22 would preferably be removed simultaneously.

As mentioned above, while the exemplary embodiment of the inner portion 30 of the disk 22 provides a plurality of spoke members 34, the inner portion 30 may take on other configurations, now known or later developed, in alternate embodiments that enable it to carry out substantially the same functionality as herein described. In one such alternate embodiment, not shown, the inner portion 30 comprises a spiral configuration, enabling it to sufficiently flex and/or radially collapse for disengaging from within the retention groove before being removed from the frame 28. Similarly, in another alternate embodiment, also not shown, the inner portion 30 comprises a "crumple-zone" configuration, again, enabling it to sufficiently flex and/or radially collapse.

It should also be noted that, given the fact that the disk 22 is configured for sufficiently flexing and/or radially collapsing as described above, the disk 22 is able to approximate not only the overall dimensions of the lens (or other object to be inserted into the retention groove 24), but the curvature, if any, as well, as illustrated best in FIG. 3; regardless of how complex the dimensions and/or curvature may be. Furthermore, given the present invention's ability to sufficiently flex and/or radially collapse with relative ease, the present invention may be removed either by hand or by machine.

Figure 10:
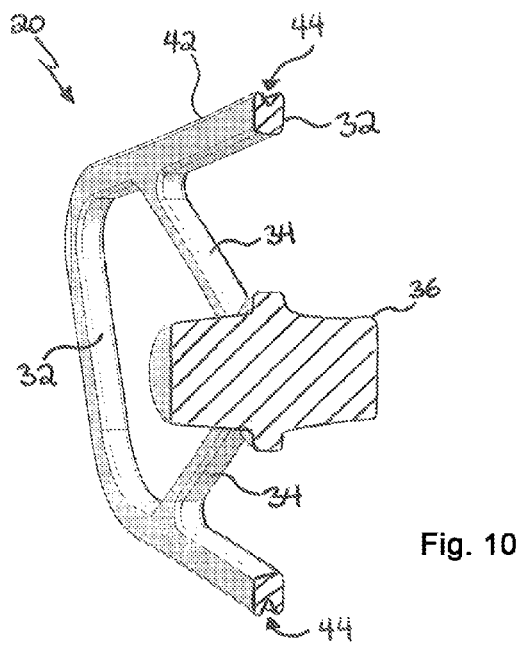
FIG. 10 is a cross-sectional view of a further exemplary embodiment of the apparatus.
Figure 11:
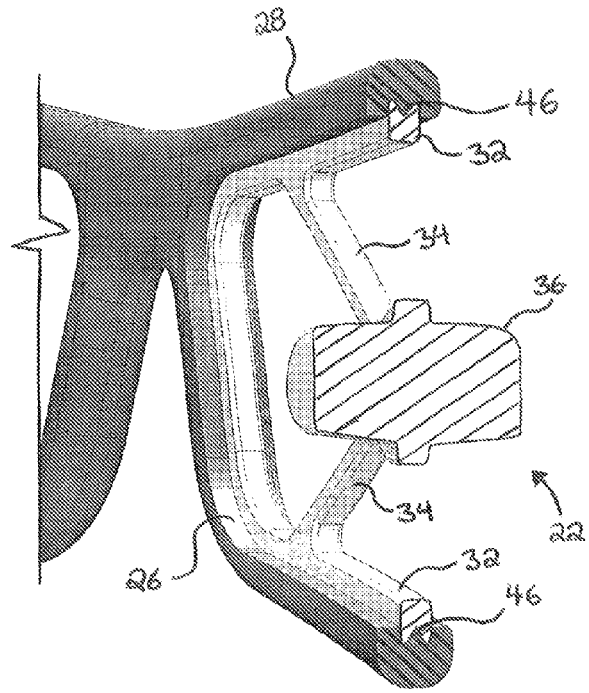
FIG. 11 is a cross-sectional view of the further exemplary embodiment of the apparatus as positioned within the exemplary molded eyewear frame.

In a still further embodiment, as shown in the cross-sectional view of FIG. 10, where the apparatus 20 is to be used in the context of eyewear manufacturing, a circumferential edge 42 of the perimeter portion 32 provides an annular perimeter groove 44 configured for forming a corresponding annular groove ridge 46 within the retention groove 24 of the frame 28 during the molding process. This is best illustrated in the cross-sectional view of FIG. 11. As such, the groove ridge 46 is preferably integrally molded with, and therefore made of the same material as, the rest of the frame 28. Preferably, the perimeter groove 44 extends about the entire perimeter portion 32; thus, forming the corresponding groove ridge 46 about the entire retention groove 24. Though, in further embodiments, the perimeter groove 44 may only be present on select portions of the perimeter portion 32. Additionally, the groove ridge 46 is preferably substantially triangular-shaped in cross-section; though it certainly may take on other shapes, now known or later developed, that enable the groove ridge 46 to carry out substantially the same functionality as herein described. The dimensions and materials of construction of the groove ridge 46 are such that, when the lens is positioned within the retention groove 24, a perimeter edge of the lens partially crushes the groove ridge 46—the groove ridge 46 thereby partially collapsing and conforming to the perimeter edge of the lens—while the lens finds a "home position" within the retention groove 24. In other words, the groove ridge 46 provides a degree of cushioning about a perimeter of the lens. As such, the groove ridge 46 is configured for better ensuring that a substantially uniform pressure or force will be applied about the perimeter of the lens, once it is inserted into the frame 28, so as to not improperly flex the lens and thereby distort its optics or, worse, fracture the lens; all while avoiding the complexity and expense of precision machining and molding, or having to use a separately formed and positioned retention groove gasket of a relatively soft material.

To summarize, regarding the exemplary embodiments of the present invention as shown and described herein, it will be appreciated that an undercut mold insert is disclosed and configured for use in forming groove-like undercuts on an inner surface of a molded part. Because the principles of the invention may be practiced in a number of configurations beyond those shown and described, it is to be understood that the invention is not in any way limited by the exemplary embodiments, but is generally directed to an undercut mold insert and is able to take numerous forms to do so without departing from the spirit and scope of the invention.

It should be noted that the various features of each of the above-described embodiments may be combined in any logical manner and are intended to be included within the scope of the present invention. It will also be appreciated by those skilled in the art that the present invention is not limited to the particular geometries and materials of construction disclosed, but may instead entail other functionally comparable structure, now known or later developed, without departing from the spirit and scope of the invention. Furthermore, while aspects of the invention have been described with reference to at least one exemplary embodiment, it is to be clearly understood by those skilled in the art that the invention is not limited thereto. Rather, the scope of the invention is to be interpreted only in conjunction with the appended claims and it is made clear, here, that the inventor believes that the claimed subject matter is the invention.

What is claimed is:

1. A mold insert apparatus for forming an undercut on an inner surface of a molded part, the undercut sized and configured for subsequently accepting and retaining an object therewithin, the apparatus comprising:
   a disk of monolithic construction substantially shaped to approximate the dimensions of the object, the disk comprising an inner portion and a substantially circumferentially integral perimeter portion;
   the perimeter portion configured for extending a distance into the inner surface of the molded part during the molding process, thereby forming the undercut therewithin; and
   the inner portion configured for at least partially radially collapsing when appropriate force is applied thereto;
   whereby, during the molding process, in which the apparatus is appropriately positioned within and subsequently forms the undercut of the molded part, upon cooling of the molded part, the inner portion is able to at least partially radially collapse, allowing substantially the entire perimeter portion to be disengaged from within the undercut before the apparatus is removed from the molded part.

2. The mold insert apparatus of claim 1, wherein the thickness of the perimeter portion approximates the thickness of the object.

3. The mold insert apparatus of claim 1, wherein the disk is further substantially shaped to approximate the curvature of the object.

4. The mold insert apparatus of claim 1, wherein the inner portion comprises a plurality of spoke members.

5. The mold insert apparatus of claim 1, wherein the inner portion provides a substantially centrally positioned locating means configured for assisting in positioning the disk within the mold during the molding process.

6. The mold insert apparatus of claim 1, wherein the disk is made from a relatively flexible material for enabling the disk to be sufficiently flexible and capable of withstanding the heat and pressure associated with the molding process.

7. The mold insert apparatus of claim 1, wherein the inner portion is approximately sixty thousandths of an inch (0.060") thick.

8. The mold insert apparatus of claim 1, wherein a circumferential edge of the perimeter portion provides an annular perimeter groove configured for forming a corresponding annular groove ridge within the undercut of the molded part during the molding process, the groove ridge configured for partially collapsing and conforming to a perimeter edge of the object, as the object is subsequently positioned within the undercut, for providing a degree of cushioning about the perimeter of the object.

9. The mold insert apparatus of claim 8, wherein the perimeter groove extends about the entire perimeter portion, thereby forming the corresponding groove ridge about the entire undercut.

10. The mold insert apparatus of claim 8, wherein the groove ridge is integrally molded with, and made of the same material as, the molded part.

11. The mold insert apparatus of claim 8, wherein the groove ridge is substantially triangular-shaped in cross-section.

12. A mold insert apparatus for forming an undercut on an inner surface of a molded part, the undercut sized and configured for subsequently accepting and retaining an object therewithin, the apparatus comprising:
   a disk substantially shaped to approximate the dimensions of the object, the disk comprising an inner portion and a substantially circumferentially integral perimeter portion;
   the perimeter portion configured for extending a distance into the inner surface of the molded part during the molding process, thereby forming the undercut therewithin; and
   the inner portion comprising a plurality of spoke members configured for at least partially radially collapsing when appropriate force is applied thereto;
   whereby, during the molding process, in which the apparatus is appropriately positioned within and subsequently forms the undercut of the molded part, upon cooling of the molded part, the inner portion is able to at least partially radially collapse, allowing substantially the entire perimeter portion to be disengaged from within the undercut before the apparatus is removed therefrom.

13. A mold insert apparatus for forming an undercut on an inner surface of a molded part, the undercut sized and configured for subsequently accepting and retaining an object therewithin, the apparatus comprising:
   a disk substantially shaped to approximate the dimensions of the object, the disk comprising:
      a continuous perimeter portion defining an opening extending therethrough, the perimeter portion configured for extending a distance into the inner surface of the molded part during the molding process, thereby forming the undercut therewithin;
      an inner portion spanning the opening of the perimeter portion and configured for at least partially radially collapsing when appropriate force is applied thereto;
   whereby, during the molding process, in which the apparatus is appropriately positioned within and subsequently forms the undercut of the molded part, upon cooling of the molded part, the inner portion is able to at least partially radially collapse, allowing substantially the entire perimeter portion to be disengaged from within the undercut before the apparatus is removed therefrom.

* * * * *